US006937873B2

(12) United States Patent
Levy et al.

(10) Patent No.: US 6,937,873 B2
(45) Date of Patent: Aug. 30, 2005

(54) METHOD AND APPARATUS FOR DROPPING AND REACQUIRING A DISPATCH CHANNEL

(75) Inventors: Rami C. Levy, Plantation, FL (US); Mark A. Barros, Wellington, FL (US)

(73) Assignee: Motorola, Inc., Schaumburg, IL (US)

( * ) Notice: Subject to any disclaimer, the term of this patent is extended or adjusted under 35 U.S.C. 154(b) by 393 days.

(21) Appl. No.: 10/349,062

(22) Filed: Jan. 22, 2003

(65) Prior Publication Data

US 2004/0142694 A1 Jul. 22, 2004

(51) Int. Cl.[7] ............................ H04Q 7/20; H04B 7/00

(52) U.S. Cl. ....................... 455/521; 455/439; 455/450; 455/507; 455/517; 455/522

(58) Field of Search ........................... 455/404.1, 426.1, 455/432.1, 436, 439, 443–444, 450, 507, 515–525, 567

(56) References Cited

U.S. PATENT DOCUMENTS 3,898,390 A * 8/1975 Wells et al. ................ 455/438
5,058,199 A * 10/1991 Grube ......................... 455/15
5,369,781 A * 11/1994 Comroe et al. ............... 455/15
6,181,946 B1 * 1/2001 Gettleman et al. .......... 455/509
6,292,671 B1 * 9/2001 Mansour ..................... 455/518

* cited by examiner

*Primary Examiner*—Binh K. Tieu

(57) ABSTRACT

A communication system (100) provides for improved dispatch communications, by providing a method for monitoring the signal quality at each of the Mobile Stations (MS) involved in a dispatch call. Once engaged in the dispatch call, the MSs (110, 112) monitor the signal quality of their ACCH channel (204) and send a message back to the system (208) if their signal quality falls below a predetermined threshold. If the signal quality of any dispatch call participant falls below the given threshold (206), the system alerts all the dispatch call participants (210) thereby avoiding any loss of communications, and tears down the previously set up dispatch call. If the signal quality becomes acceptable again (216) for those MS who had previously experienced poor signal quality, they send a message to the system, which automatically sets up a new dispatch call and alerts all the dispatch participants that the dispatch channel can be used again (218).

20 Claims, 3 Drawing Sheets

METHOD AND APPARATUS FOR DROPPING AND REACQUIRING A DISPATCH CHANNEL

TECHNICAL FIELD

This invention relates in general to the field of wireless communications. More specifically, this invention relates to a method and apparatus for automatically dropping and reacquiring a dispatch channel.

BACKGROUND

A wireless communication system such as the Motorola Integrated Digital Enhanced Network (IDEN®) combines the capabilities of a digital cellular phone with the benefits of a two-way radio with "push-to-talk" (PTT) dispatch feature. This combining of mobile communication technologies provides for state-of-the-art functions and benefits to mobile users while optimizing the available infrastructure resources such as the Radio Frequency (RF) spectral resources.

When operating in the dispatch mode, the typical cell-to-cell handoff procedure that occurs when a telephone user is on the move is known as "drag and drop" or "hard-hand-off" as compared to the "soft-handoff" that occurs when operating in the cellular mode. During a dispatch mode hand-off, there is usually a period of time during the transition between cells in which the audio may become warped. The dispatch link may also be dropped while a new channel is located by the system. If a person happens to be talking during the time the dispatch communication link is dropped by the system, the person will not know that the link has been dropped and that the other dispatch call participants will not have properly received some part of the conversation. This of course presents confusion to all parties involved in the dispatch call with regard to how much was heard and how much needs to be repeated, once the dispatch channel is reestablished. Therefore, a need exists for a method and apparatus for automatically dropping and reacquiring a dispatch channel that can help minimize some of the dispatch channel handoff problems previously mentioned.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
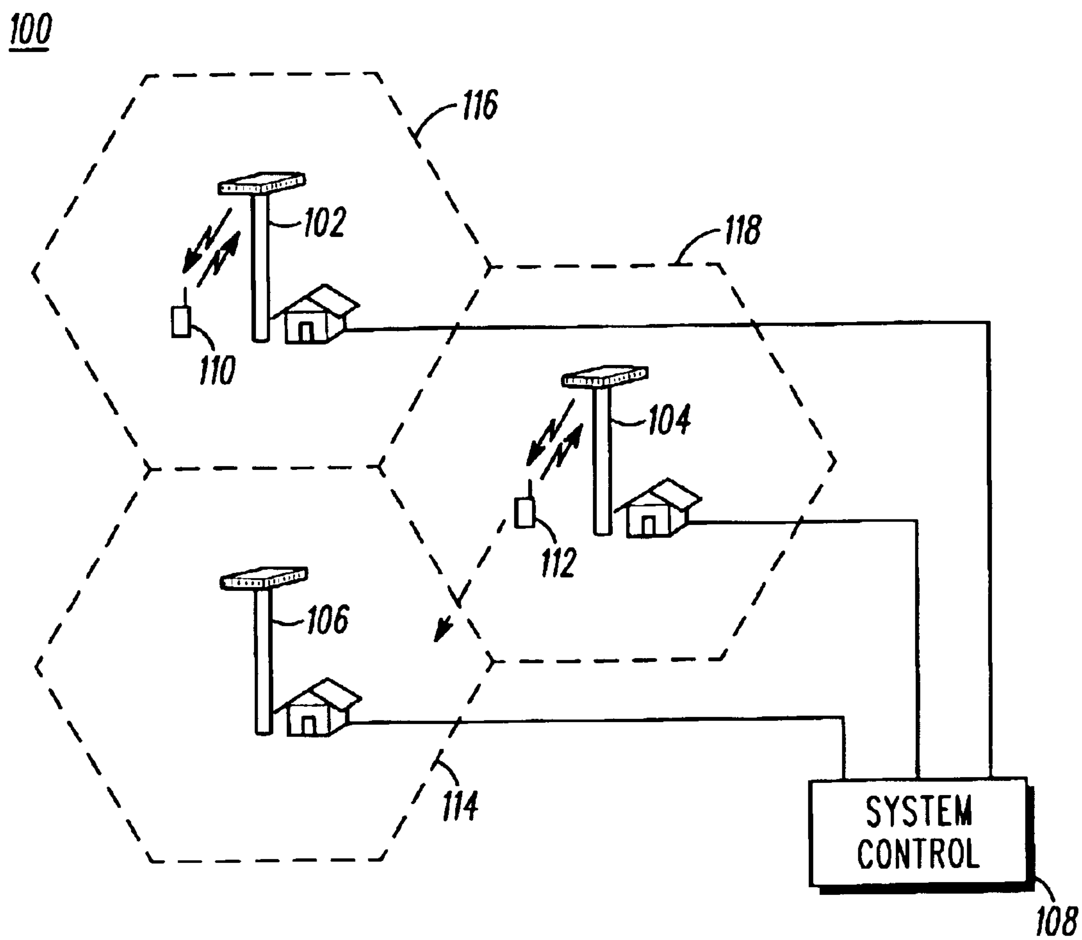
FIG. 1 shows a diagram of a communication system in accordance with the invention.

While the specification concludes with claims defining the features of the invention that are regarded as novel, it is believed that the invention will be better understood from a consideration of the following description in conjunction with the drawing figures.

Referring now to the drawing and in particular to FIG. 1, there is shown a diagram of a communication system 100 in accordance with the invention. Communication system 100 supports dispatch mode of communication and can comprise a conventional IDEN® communication system that has been modified to support the present invention as described below, or other communication system having dispatch capability.

In communication system 100 a plurality of Enhanced Base Transceiver Systems (EBTS, hereinafter referred to as cell sites, cells or base stations) 102, 104 and 106 provide the RF link between the land network and the portable communication devices or Mobile Stations (MS) 110 and 112. Each cell site 102, 104, and 106 provides communication coverage over their respective cell coverage areas 116, 118 and 114.

Each cell site 102, 104 and 106 includes an Access Control Gateway (ACG, not shown) that acts as the site controller, and the communication gateway between the cell site and the system's central control 108. The ACG determines if a call is a dispatch, interconnect or packet data call and routes the traffic accordingly. Each cell site 102, 104 and 106 also includes one or more Base Radios (BR's, not shown), which are controlled by the ACG. System control 108 is comprised of several IDEN® communication system control components such as the Dispatch Application Processor (DAP) that is responsible for the overall coordination and control of dispatch and packet data services in the system, the Base Site Controller (BSC) which manages the interconnect call processing between the EBTS and other system devices, the Mobile Switching Center (MSC) which is the interface between the mobile network and other service provider's PST N's. A more detailed discussion of a conventional IDEN® communication system can be found in a publication entitled, IDEN® Technical Overview, Motorola publication number 68P81095E55-E, dated Aug. 8, 2000, which is hereby incorporated by reference.

When MS 110 and MS 112 are involved in a dispatch call, and MS 112 is moving from cell area 118 towards cell area 114, in accordance with the preferred embodiment of the invention, MS 112 and MS 114 monitor the signal quality, such as the signal strength of incoming signals while engaged in the dispatch call. Although signal strength is used in the preferred embodiment, other signal quality criteria can be used, for example, bit-error-rate, etc. Preferably, MS 112 and MS 114 monitor traffic flow on their respective Associated Control Channel (ACCH) while they are participating in the dispatch call. Once one or more of the dispatch channel participant's, such as MS 112 in this case, moves further from cell site 104, and determines that its signal strength has fallen below an acceptable threshold level, it sends a notice of the impending channel loss to EBTS 104 which forwards the information on to system control 108. In response to receiving the notice of the low signal quality at one or more of the dispatch call participants, the system control 108, primarily handled by the DAP (not shown), sends a notice to MS 110 and MS 112 informing them that the dispatch call between them will be temporarily disrupted.

The loss of the dispatch channel signal sent to MS 110 and MS 112 can cause an audible tone, or other type of alert (e.g., visual, vibratory, etc.) to be provided at MS 110 and MS 112. This alert signal lets MS 110 and MS 112 know that their dispatch call will be momentarily disrupted (suspended), and alerts the users that they should hold off momentarily with their conversations, since one or more of the dispatch call participants is having signal quality problems.

In the preferred embodiment, the ACCH is used to monitor the signal quality in this case, the signal strength of the received signals at each of the MSs 110, 112 involved in the dispatch call because the ACCH is the only active control channel available during voice communication, the ACCH is formed by taking bits from the Traffic Channel (TCH). The ACCH carries control and supervisory signaling for an MS while the user is engaged in voice communication. Although the ACCH is used in the preferred embodiment, respective MSs can also use other channel(s) that could provide the needed signal quality check.

After MS 110 and MS 112 have been alerted, the system 100 drops the previously established dispatch link between MS 110 and MS 112, and searches to reacquire a better channel for the dispatch call by continuously monitoring the signal strength levels from both MS 110 and MS 112. The system may monitor the signal strength of both MS 110 and MS 112 by preferably monitoring signal strength information sent by MS 110 and MS 112 to system control 108.

In an alternate embodiment, only those MS units, who had previously informed the system that their signal strength levels were below the predetermined threshold, need to transmit back their signal strength levels or other signal quality measurements. In order to save system overhead, these unit(s) would only need to inform the system of their signal quality level after it had gone back above the predetermined threshold level. When both signal strength levels are above a predetermined threshold, a dispatch channel is automatically re-established by the system control 108 and indication such as an audible alert is sent to both MS 110 and MS 112 that indicates to the users that their dispatch conversation may resume.

Figure 2:
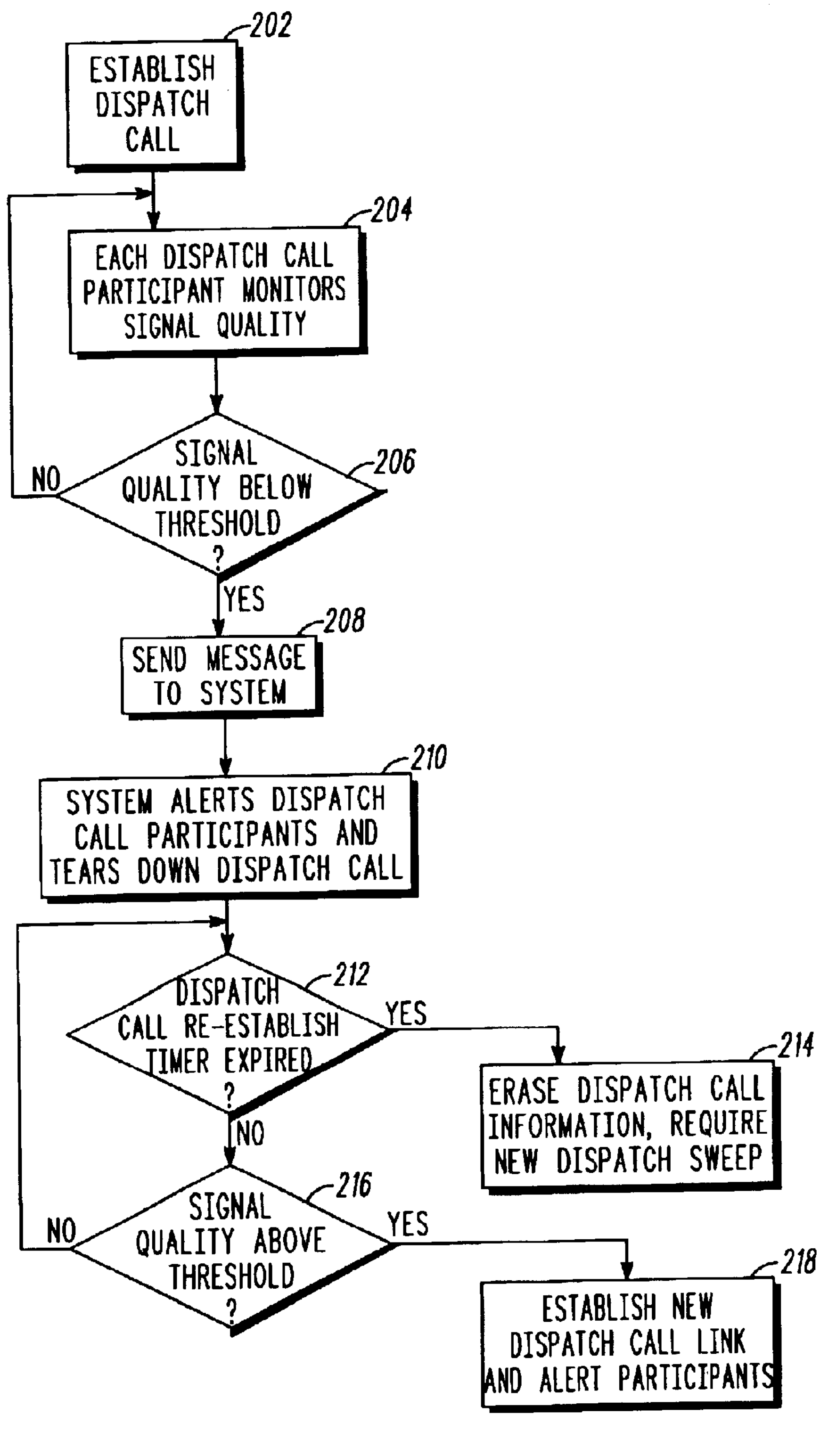
FIG. 2 shows a flow diagram illustrating the steps of dropping and reacquiring a dispatch channel in accordance with the invention.

Referring now to FIG. 2, there is shown a flow diagram of the steps taken in accordance with the preferred embodiment. In step 202, a dispatch call is established between two or more MSs. In step 204, each of the MSs continuously monitors the signal quality of the ACCH while in the dispatch call. In step 206, one (or more) of the MS determines that its signal quality such as the signal strength of signals on the ACCH have fallen below a predetermined threshold, and sends a notification signal (signal quality information message) to its EBTS in step 208 which is forwarded to system control 108. In step 210, in response to receiving the signal quality information message, the system control 108 alerts all the dispatch call participants that the dispatch channel link will be dropped by sending an alert signal and the system tears down the dispatch communication link that had been established. The "bad channel" alert signal sent by the system can cause a distinct audible, visual, vibratory or other type of alert to be provided at each of the MS units participating in that particular dispatch call. The alert signal lets the dispatch call participants know that they should temporarily cease from continuing to talk.

In step 212, the system control 108 maintains information (e.g., participants involved, channel assignments, etc.) on the previously dropped dispatch call for a predetermined period of time referred to as the re-establishment time period, and continues to monitor the MSs to determine if the MSs involved in the dispatch call are all above their required signal strength levels. The amount of time the system control 108 maintains the information on the dropped dispatch channel can vary depending on system requirements. If the reestablishment time period (timer) expires prior to all of the dispatch call MS units having acceptable signal strength levels, the system control 108 in step 214, erases all the previously established dispatch call information stored in the system, requiring that a new dispatch call be set-up from scratch.

If the re-establish timer has not expired, in step 216, the system control 108 determines if the signal quality for all MS units is above the required threshold level. If it is determined that all of the dispatch call participants have acceptable signal quality, in step 218, the system control 108 automatically establishes a new dispatch call link and alerts all the dispatch call participants by transmitting a "good channel" alert signal. The system automatically sends any needed set-up information to all of the MSs involved in the dispatch call, given that one or more of the MSs may be located in new cell sites, etc. The system preferably sets up the required communication link and places each MS into the proper state so that the dispatch call can be re-established with a single PTT activation at any of the MS units. The indication that a new dispatch channel is ready can be given via an alert signal such as an audible or visual signal (e.g., light flashing) at each of the MSs, or other form of indication.

In the case where one or more of the original dispatch call participants is engaged in another activity (e.g., has established another dispatch call, is involved in an interconnect call, etc.) or has turned off the MS prior to receiving the alert signal that the dispatch call has been re-established, can be dealt with in different ways depending on the particular system design. For example, the good channel alert signal could override any present activity the MS may be involved in, or the system could wait until the MS(s) involved has finished with its current activity, and if the dispatch call is still ongoing, alert and re-establish the dispatch call for those unit(s) at that time.

Figure 3:
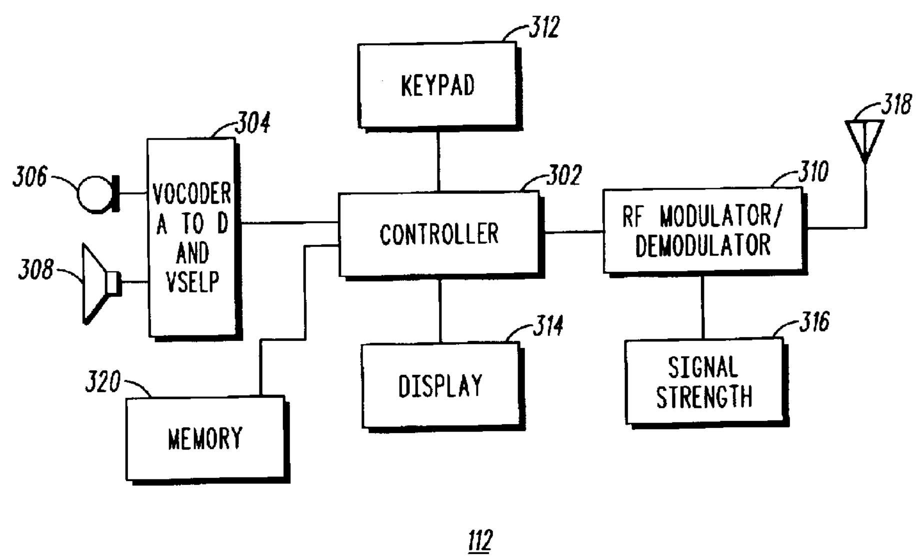
FIG. 3 shows a block diagram of a communication device in accordance with the invention.

In FIG. 3, there is shown a simplified diagram of the MS 112. MS 112 includes a controller such as a microprocessor and/or digital signal processor 302 that controls the functions and operations of the MS 112. A keypad and user controls 312 are coupled to the controller 302 as well as display 314. A microphone 306 is provided for converting voice from the user into electrical signals, while a speaker 308 provides audio signals to the user.

A Vector Sum Excited Linear Predicting (VSELP) voice codec (vocoder) and Analog-to-Digital (A to D) (and also Digital-to-Analog) block 304 provides all the necessary digital voice processing for converting analog voice into digital data ready for RF transmission and vice versa.

RF modulator/demodulator block 310 transmits and receives the RF signals via antenna 318. A signal strength block 316 measures the signal strength of the ACCH as required by the present invention. The controller 302 determines if the signal strength as measured by the signal strength block 316 falls below a predetermined threshold level that is preferably stored in memory 320. If the measured signal strength during a dispatch call falls below the predetermined level, controller 302 causes MS 112 to transmit a message to the system as previously described above.

By monitoring the signal quality of each MS unit participating in a dispatch call and automatically informing the MS units if one or more of the units is in a bad quality of signal situation, avoids the problem of users continuing on with their conversations even when one or more of the other dispatch group members is not in a good position to receive the conversation. Automatically setting the dispatch call back up when the participants are all experiencing good quality of signal reception makes the process very convenient for all of the dispatch call members. The system can drop the dispatch call session information if the quality of signal for each of the dispatch members does not reach an acceptable level within a predetermined period of time. If this time period expires, the system erases all dispatch session information, requiring the dispatch call to be set up from scratch by one of the dispatch call members. This avoids the system from having to store dispatch call set up information in situations where one or more of the dispatch call members may not be able to receive the dispatch call properly.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a communication system providing for dispatch communications between a plurality of communication devices, a method for dropping and reacquiring a dispatch channel comprising the steps of:

(a) establishing a dispatch call between the plurality of communication devices;

(b) monitoring the signal quality of received signals at each of the plurality of communication devices while in the dispatch call;

(c) transmitting a signal to the communication system from one or more of the plurality of communication devices if the signal quality at the one or more of the plurality of communication devices falls below a predetermined threshold; and (d) transmitting an alert signal back from the communication system to each of the plurality of communication devices involved in the dispatch call in response to the signal transmitted in step (c), the alert signal informing the plurality of communication devices that the dispatch call has been suspended.

2. A method as defined in claim 1, further comprising the steps of:

(e) determining if the signal quality of each of the plurality of communication devices involved in the dispatch call is acceptable;

(f) re-establishing the dispatch call if the signal quality of each of the plurality of communication devices is found to be acceptable in step (e); and (g) alerting the plurality of communication devices that the dispatch call has been re-established.

3. A method as defined in claim 2, wherein step (f) is performed only if the signal quality of each of the plurality of communication devices involved in the dispatch call is at an acceptable level within a predetermined period of time.

4. A method as defined in claim 3, wherein step (f) includes the sub steps of:

(f1) automatically setting up the required communication link(s) for the dispatch call; and (f2) automatically placing each of the plurality of communication devices into the proper state for the dispatch call so that all that is required is the activation of a push-to-talk switch at any one of the plurality of communication devices to transmit a message.

5. A method as defined in claim 3, wherein if the signal quality of each of the plurality of communication devices involved in the dispatch call is not at an acceptable level within the predetermined period of time, the communication system deletes any set up information regarding the dispatch call it had retained, requiring a new dispatch call to be set up by one of the plurality of communication devices.

6. A method as defined in claim 1, wherein step (b) comprises monitoring the signals received from an Associated Control Channel (ACCH).

7. A method as defined in claim 6, wherein the signal quality monitored in step (b) is the signal strength level of the signals received from the ACCH.

8. A method as defined in claim 1, wherein in response to receiving the signal transmitted in step (d) by the communication system, each of the plurality of communication devices causes an audible, visual or vibratory alert to be provided at each of the plurality of communication devices which alerts the communication device users that the dispatch call has been suspended.

9. A communication device that can operate in a dispatch mode where it communicates with one or more other communication devices over an assigned dispatch link assigned by a communication system, the communication device comprising:

a controller;

a signal quality measuring circuit coupled to the controller;

a transmitter coupled to the controller;

a receiver coupled to the controller; and the controller causes the signal quality measuring circuit to commence measuring the signal quality of signals received by the receiver once the communication device is placed in the dispatch mode, and causes the transmitter to transmit a message to the communication system if the signal quality of the received signals falls below a predetermined threshold.

10. A communication device as defined in claim 9, further comprising:

a memory coupled to the controller, and the predetermined threshold is stored in the memory.

11. A communication device as defined in claim 9, wherein the signal measuring circuit measures the signal quality of signals that are received over an Associated Control Channel (ACCH).

12. A communication device as defined in claim 9, wherein the signal quality circuit comprises a circuit that can measure the signal strength level of the received signals.

13. A communication device as defined in claim 9, wherein the communication device is a portable communication radio that can operate in an Integrated Digital Enhanced Network system that provides for both dispatch and cellular modes of operation.

14. A communication device as defined in claim 9, further comprising:

a speaker coupled to the controller; and upon receiving a signal at the receiver informing the communication device that the dispatch call has been suspended, the controller causes an audible alert to be sounded at the speaker.

15. A communication device as defined in claim 9, further comprising:

a display coupled to the controller; and upon receiving a signal at the receiver informing the communication device that the dispatch call has been suspended, the controller causes a visual alert to be displayed on the display.

16. A communication system providing for a dispatch mode of communications between a plurality of communication devices, the communication system comprising:

one or more base transceivers;

a system control coupled to the one or more base transceivers; and the system control establishing a dispatch call link between the plurality of communication devices and monitoring for signal quality information that may be transmitted by one or more of the plurality of communication devices, while the plurality of communication devices are involved in the dispatch call.

17. A communication system as defined in claim 16, wherein the system control transmits an alert signal via the one or more base transceivers to each of the plurality of communication devices involved in the dispatch call if it receives a signal quality information message from one or more of the plurality of communication devices that informs it that the signal quality at the one or more of the plurality of communication devices is below a predetermined threshold level.

18. A communication system as defined in claim 17, wherein the system control in response to receiving the signal quality information message from the one or more of the plurality of communication devices that informs it of the signal quality problem being experienced by one or more of the plurality of communication devices suspends the dispatch call.

19. A communication system as defined in claim 18, wherein once the one or more communication devices from among the plurality of communication devices that had experienced signal quality problems sends a message to the system control informing it that its signal quality is at an acceptable level again, the system control automatically re-establishes the dispatch call and alerts the plurality of communication devices so that the plurality of communication devices can continue with their dispatch call.

20. A communication system as defined in claim 17, wherein the communication system comprises an Integrated Digital Enhanced Network that supports dispatch and cellular telephone modes of operation.

* * * * *